J. P. BECKER.
AUTOMOBILE TURNING SIGNAL LIGHT.
APPLICATION FILED OCT. 3, 1916.
1,253,337.
Patented Jan. 15, 1918.
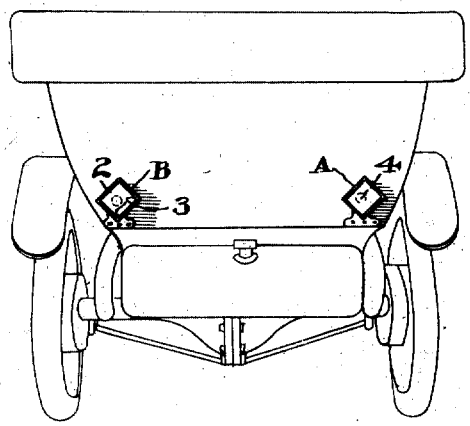
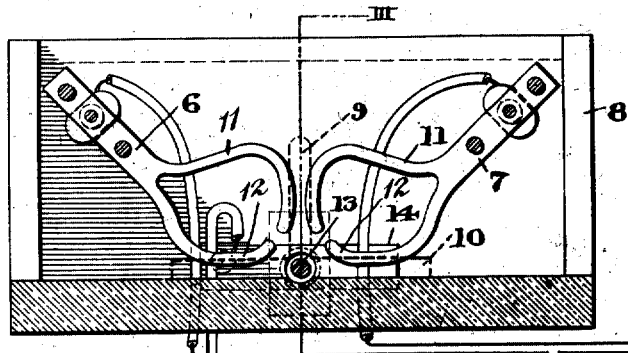
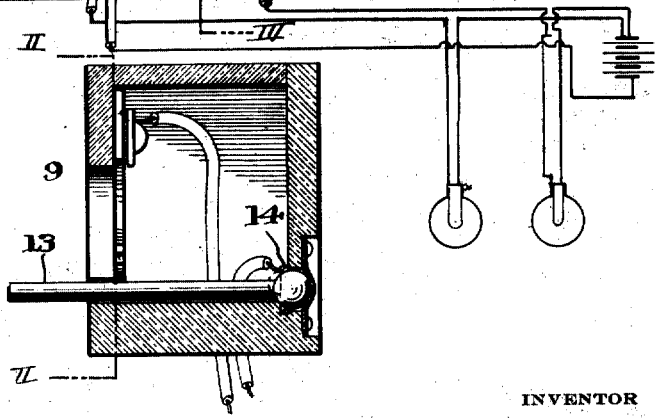
INVENTOR
Johannes P. Becker

UNITED STATES PATENT OFFICE.

JOHANNES P. BECKER, OF BERKELEY, CALIFORNIA.

AUTOMOBILE TURNING-SIGNAL LIGHT.

1,253,337.

Specification of Letters Patent.

Patented Jan. 15, 1918.

Application filed October 3, 1916. Serial No. 123,503.

*To all whom it may concern:*

Be it known that I, JOHANNES P. BECKER, a citizen of the United States, residing at Berkeley, in the county of Alameda and State of California, have invented new and useful Improvements in Automobile Turning-Signal Lights, of which the following is a specification.

This invention relates to signal lights for vehicles, and particularly such as are applied to the rear of automobiles and capable of being so manipulated as to indicate to any one following that the machine in advance is about to turn to the right or left, or to stop.

The invention consists in the location of colored indicators, of peculiar shape, at the right and left rear of the vehicle and energizing the illuminating means, behind one or the other of these indicators as required, by means of a peculiar switch located in convenient position relative to the operator, so as to direct the electrical current from a source of energy to either reflector for a turn, or to both for a stop.

The invention also comprises details of construction which will be more fully explained by reference to the accompanying drawings, in which—

Figure 1 is a rear view of an automobile showing the position of the lamps.

Fig. 2 is a section through line 2—2 of Fig. 3, showing the removed front piece in dotted lines.

Fig. 3 is a cross section on line 3—3 of Fig. 2.

As at present illustrated, A and B are two lamp cases of any suitable or desired shape. I have here shown these cases of diamond form, and they may be located to the right and left respectively, at the rear of the vehicle or train. The visible end is fitted with a ground or translucent glass 2, and inside of this is a colored glass 3. At a sufficient distance behind these faces is located an incandescent or other lamp 4 and a reflector which throws the light strongly against the sight glasses. The illumination of either indicates that a turn to that side is about to be made and when both are illuminated at once, a stop is to be made.

The change in the lights is effected by means of a switch mechanism located in convenient proximity to the driver. I have shown this mechanism as consisting of two metal conducting plates 6 and 7 fixed within a container or support 8, of insulating material. The support 8 has a vertical slot 9 made midway between the plates 6 and 7 and a horizontal channel 10 in each direction and at right angles from the end of the slot. Each of the plates has extensions 11 and 12. The arms 11 and 12 of each are formed so as to extend along the edges of the slot 9, and each of the other arms 12 extend along the channel 10. All these arms have inturned outer ends for a purpose to be hereinafter described.

13 is a rod or lever having at its rear end a ball bearing connection with a conducting plate 14 and with which one electrode is connected, while the opposing electrodes are connected with the plates 6 and 7. This rod normally lies in a groove which is directly beneath the slot 9 and from which it can be moved in either direction along the channel 10. The inturned ends of the arms 11 and 12 allow the rod 13 to be pushed past them and to move in contact with the outer edges of the arms, thus forming a circuit through the rod, the arms and the plates 6 or 7. At the same time the lamp corresponding with the arm with which the rod contacts will be energized and the light upon that side will be shown.

If the rod is pushed vertically upward to indicate a stop, it will move up the slot 9 and between the arms 11 and 12, with both of which it contacts and thus energizes both at once and shows both lights and the warning to stop.

Having thus described my invention, what I claim and desire to secure by Letters Patent is—

1. In a circuit controller, a switch member including a rod, unitary contacts each having a pair of arms, one arm of each contact being arranged opposite to each other so as to be simultaneously engaged by said rod at substantially diametrically opposite points on said rod, the other arms of the contacts being arranged so as to be independently engaged by said rod at a point in approximate alinement with said points of the rod, and means to guide said rod into said engaging positions.

2. In a circuit controller, a switch member, unitary contacts each having a pair of arms, one arm of each contact being arranged opposite to each other so as to be simultaneously engaged by said member and the other arms of the contacts being arranged so as to be independently engaged by said member, means to guide said member, and means to mount said member so that each of the arms will engage substantially the same part of said member.

3. In a circuit controller, a member having a substantially T-shaped slot, a switch rod pivoted at a point in alinement with the intersection of the head and leg of the slot and movable in said head and leg of the latter, a pair of substantially C-shaped contacts arranged so that each has one end on the respective sides of the leg of the slot to be simultaneously engaged by the rod when the latter is moved into the leg of the slot, the other ends of the contacts being arranged at one side of the respective ends of the head of the slot so as to independently engage said rod as the latter is moved into the respective ends of the head of the slot.

4. In a circuit controller, a switch member, unitary contacts having parts arranged to simultaneously engage said member and other parts arranged to independently engage said member, and means to mount said member so that each of the contact parts will engage substantially the same part of said member.

In testimony whereof I have hereunto set my hand in the presence of two subscribing witnesses.

JOHANNES P. BECKER.

Witnesses:
 JOHN H. HERRING,
 W. W. HEALEY.